United States Patent
Beccari

(10) Patent No.: US 12,497,144 B2
(45) Date of Patent: Dec. 16, 2025

(54) CONNECT AND DISCONNECT ASSEMBLY, AND SHIP-LIFT BOGIE INCLUDING SAID CONNECT AND DISCONNECT ASSEMBLY

(71) Applicant: Dana Motion Systems Italia S.R.L., Reggio Emilia (IT)

(72) Inventor: Fabio Beccari, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 964 days.

(21) Appl. No.: 17/681,927

(22) Filed: Feb. 28, 2022

(65) Prior Publication Data

US 2022/0281572 A1 Sep. 8, 2022

(30) Foreign Application Priority Data

Mar. 2, 2021 (DE) ...................... 20 2021 101 019.3

(51) Int. Cl.
- *F16D 23/12* (2006.01)
- *B63C 3/08* (2006.01)
- *F16D 55/24* (2006.01)

(52) U.S. Cl.
CPC ................ *B63C 3/08* (2013.01); *F16D 23/12* (2013.01); *F16D 55/24* (2013.01); *F16D 2023/123* (2013.01)

(58) Field of Classification Search
CPC .. B63C 3/08; B63C 3/06; B61C 13/02; F16D 23/12; F16D 2023/123; F16D 55/24; F16D 59/02; F16D 13/56; F16D 47/00
See application file for complete search history.

(56) References Cited

U.S. PATENT DOCUMENTS

| | | |
|---|---|---|
| 3,612,312 A | 10/1971 | Behrmann et al. |
| 7,147,240 B2 | 12/2006 | Naito |
| 10,065,840 B2 | 9/2018 | Izumi |
| 2017/0045096 A1* | 2/2017 | Kishimoto ............. F16D 23/12 |
| 2017/0241494 A1* | 8/2017 | Jones ...................... F16D 55/24 |
| 2018/0073573 A1* | 3/2018 | Lien ....................... F16D 23/14 |
| 2019/0257375 A1* | 8/2019 | Iwano ..................... F16D 13/52 |
| 2019/0263488 A1 | 8/2019 | Taylor et al. |
| 2022/0268358 A1* | 8/2022 | Kishida ................. F16D 13/52 |
| 2024/0011559 A1* | 1/2024 | Mori ....................... B60K 1/00 |

FOREIGN PATENT DOCUMENTS

| | | |
|---|---|---|
| KR | 200414344 Y1 | 4/2006 |
| KR | 100770737 B1 | 10/2007 |
| RU | 2319638 C1 | 3/2008 |

* cited by examiner

Primary Examiner — Lori Wu
(74) Attorney, Agent, or Firm — Marshall & Melhorn, LLC

(57) ABSTRACT

A connect and disconnect assembly may have a first rotatable shaft and a second rotatable shaft aligned along a rotational axis. The assembly may also have a connect and disconnect device including one or more cams for selectively connecting and disconnecting the first rotatable shaft to and from the second rotatable shaft. A ship-lift bogie may include the connect and disconnect assembly.

19 Claims, 7 Drawing Sheets

CONNECT AND DISCONNECT ASSEMBLY, AND SHIP-LIFT BOGIE INCLUDING SAID CONNECT AND DISCONNECT ASSEMBLY

FIELD

The present disclosure relates to a connect and disconnect assembly, in particular for use in a ship-lift bogie. The present disclosure further relates to a ship-lift bogie including said connect and disconnect assembly.

BACKGROUND

Usually, a ship-lift bogie or a plurality of ship-lift bogies arranged in a queue are used to transport a ship from the water to a parking place where the ship can be painted or repaired, for example. The number of ship-lift bogies in the queue changes depending on factors such as the weight and/or the length of the ship.

For adding or removing from the queue one or more bogies, a fork-lift or a similar vehicle may be used. Normally, the bogie is moved or towed by the fork-lift.

Known ship-lift bogies typically include a motor such as a hydraulic motor connected to the wheels of the ship-lift bogie via a gearbox such as a planetary gearbox. Such motors may be pulled in an unscathed manner only at speeds up to an indicated maximum motor speed. Moving or towing such bogies at higher speeds may cause cavitation in the hydraulic motor, for example.

In new projects for new shipyards, it is desired that the bogies be towed at a significantly higher speed in order to expedite workflow. In other words, when towed, the bogie would move at a speed drastically greater than when merely working hydraulically with load. Naturally, the motor-gearbox that drives the bogie would be pulled to a high speed as well.

US 2019/0263488A1 discusses vessel transfer systems. The systems include bogies, including a pivoting bogie and a rack and pinion bogie, as well as associated cradles, carriages, and power and control units. The pivoting bogie includes a first side frame, a second side frame, at least one wheel coupled with each of the first and second side frames, and a lift member coupled with each of the first and second side frames. The lift member is pivotably coupled to the first side frame. The rack and pinion bogie includes a frame and pinion gears coupled with the frame. The pinion gears can be selectively coupled with a gear rack, such as at a shipyard. Also provided therein are methods of use of one or both of the bogies and associated equipment, such as for moving vessels within a shipyard.

In view of the prior art, the objective of the present disclosure is to provide a connect and disconnect assembly that allows an operator to selectively engage and disengage a first rotatable shaft, which may be connected to a motor, with and from a second rotatable shaft, which may be connected to a set of wheels or to a gearbox, for example.

SUMMARY

This problem is solved by a connect and disconnect assembly incorporating the features of the claims. Special embodiments are described in the dependent claims.

Thus, a connect and disconnect assembly is presently proposed, in particular for but not restricted to use in a ship-lift bogie. The proposed connect and disconnect assembly comprises: a first rotatable shaft and a second rotatable shaft aligned along a rotational axis; and a connect and disconnect device including one or more cams for selectively connecting and disconnecting the first rotatable shaft to and from the second rotatable shaft.

The connect and disconnect device including one or more cams provides a simple mechanical means for connecting and disconnecting the two rotatable shafts. For example, the connect and disconnect device of the presently proposed type is typically easy to use and can be produced and maintained in a simple manner and at low cost.

The one or more cams may be rotatable with respect to a cam axis wherein the cam axis is arranged in a plane perpendicular to the rotational axis.

The connect and disconnect device may further comprise: one or more first friction discs rotationally fixed to the first rotatable shaft, and one or more second friction discs rotationally fixed to the second rotatable shaft, wherein the one or more cams are configured to selectively engage and disengage the one or more first friction discs with and from the one or more second friction discs.

The one or more first friction discs and the first rotatable shaft may include correspondingly shaped recesses and protrusions and may be engaged with one another via the correspondingly shaped recesses and protrusions, for example in such a way that the one or more first friction discs are rotationally fixed to the first rotatable shaft and are movable relative to the first rotatable shaft along the rotational axis. Additionally or alternatively, the one or more second friction discs and the second rotatable shaft may include correspondingly shaped recesses and protrusions and may be engaged with one another via the correspondingly shaped recesses and protrusions, for example in such a way that the one or more second friction discs are rotationally fixed to the second rotatable shaft and are movable relative to the second rotatable shaft along the rotational axis.

The recesses and protrusions of the one or more first frictions discs and the first rotatable shaft may be spline-shaped or lobe-shaped. Additionally or alternatively, the recesses and protrusions of the one or more second frictions discs and the second rotatable shaft may be spline-shaped or lobe-shaped.

The first rotatable shaft may include a ring gear encompassing a portion of the second rotatable shaft. The one or more first friction discs may then be rotationally fixed to the ring gear of the first rotatable shaft and the one or more second friction discs may then be rotationally fixed to the portion of the second rotatable shaft encompassed by the ring gear of the first rotatable shaft.

The connect and disconnect device may further comprise a piston movable relative to the first rotatable shaft and relative to the second rotatable shaft along the rotational axis, wherein the piston is configured to force the one or more first friction discs and the one or more second friction discs into engagement with one another.

The connect and disconnect device may further comprise a first biasing member such as a spring biasing the one or more first friction discs and the one or more second friction discs into engagement with one another. For example, the first biasing member may bias the one or more first friction discs and the one or more second friction discs into engagement with one another via the piston. The first biasing member may be supported on the first rotatable shaft or on the second rotatable shaft. The one or more cams may be configured to move the piston along the rotational axis. For instance, the one or more cams may be configured to push the piston away from the one or more first friction discs and from the one or more second friction discs to disengage the one or more first friction discs and the one or more second friction discs from one another.

The one or more cams and the piston may each comprise a level surface portion. The one or more cams may then be configured to hold the piston in a position in which the piston allows the one or more first friction discs and the one or more second friction discs to disengage from one another by supporting the level surface portion of the piston on the level surface portion of the one or more cams.

Advantageously, the level surface may secure the disengagement position. Furthermore, forces exerted on the one or more cams and on the piston such as via the above-described first biasing member or caused by shocks or vibrations may be better spread on the level surface portions of the one or more cams and of the piston. For example, the one or more cams and the piston may be configured such when the one or more cams support the level surface portion of the piston on the level surface portion of the one or more cams, the level surface portion of the piston and the level surface portion of the one or more cams are arranged perpendicular to the rotational axis.

The connect and disconnect device may further comprise a lever connected to the one or more cams for rotating the one or more cams.

The connect and disconnect assembly may further comprise a motor drivingly engaged with or selectively drivingly engaged with the second rotatable shaft. For example, the motor may comprise a hydraulic motor, a pneumatic motor or an electric motor. In case the motor comprises the electric motor, the electric motor may comprise an electric parking brake assembly integrated with the electric motor. The electric parking brake assembly integrated with the electric motor may provide a high degree of physical compactness, for example.

The connect and disconnect assembly may further comprise a housing. The second rotatable shaft may then be rotatably disposed within the housing. The connect and disconnect assembly may further comprise a parking brake assembly configured to selectively frictionally engage the second rotatable shaft with the housing. For example, when the connect and disconnect assembly is disposed in a ship-lift bogie, the parking brake assembly may be used to stabilize the ship-lift bogie and the weight above it when the ship-lift bogie is stationary.

The parking brake assembly may comprise: one or more first brake discs rotationally fixed to the second rotatable shaft, and one or more second brake discs rotationally fixed to the housing and configured to be frictionally engaged with the one or more first brake discs.

The one or more first brake discs and the second rotatable shaft may include correspondingly shaped recesses and protrusions and may engaged with one another via the correspondingly shaped recesses and protrusions, for example in such way that the one or more first brake discs are rotationally fixed to the second rotatable shaft and are movable relative to the second rotatable shaft along the rotational axis. Additionally or alternatively, the one or more second brake discs and the housing may include correspondingly shaped recesses and protrusions and may be engaged with one another via the correspondingly shaped recesses and protrusions, for example in such a way that the one or more second brake discs are rotationally fixed to the housing and are movable relative to the housing along the rotational axis.

The recesses and protrusions of the one or more first brake discs and of the second rotatable shaft may be spline-shaped or lobe-shaped. Additionally or alternatively, the recesses and protrusions of the one or more second brake discs and of the housing may be spline-shaped or lobe-shaped.

The parking brake assembly may further comprise a second biasing member such as a spring biasing the one or more first brake discs and the one or more second brake discs into engagement with one another.

The parking brake assembly may further comprise a hydraulically actuatable piston disposed in between the second biasing member and the one or more first brake discs and the one or more second brake discs. For example, the hydraulically actuatable piston may be configured to counteract the second biasing member to allow the one or more first brake discs and the one or more second brake discs to disengage.

The housing of the connect and disconnect assembly may enclose a first space accommodating the one or more first friction discs and the one or more second friction discs, and the housing of the connect and disconnect assembly may enclose a second space accommodating the one or more first brake discs and the one or more second brake discs. The first space and the second space may then be in fluid communication with one another, thereby allowing a lubricant to pass from the first space to the second space, or vice versa. The first space and the second space may allow for the provision of room for the lubricant during its thermal expansion as the working temperature of the connect and disconnect assembly rises, for example.

For instance, the first space and the second space may be in fluid communication with one another via the recesses of the first friction discs and/or of the second rotatable shaft.

The presently proposed ship-lift bogie comprises a pair of wheels configured to run on a rail-track, and the above-described connect and disconnect assembly, wherein the pair of wheels is drivingly engaged or selectively drivingly engaged with the first rotatable shaft.

DESCRIPTION OF THE FIGURES

An embodiment of the presently proposed connect and disconnect assembly and of a ship-lift bogie including said connect and disconnect assembly are explained in the following detailed description with respect to the accompanying drawing in which.

DETAILED DESCRIPTION

Figure 1:
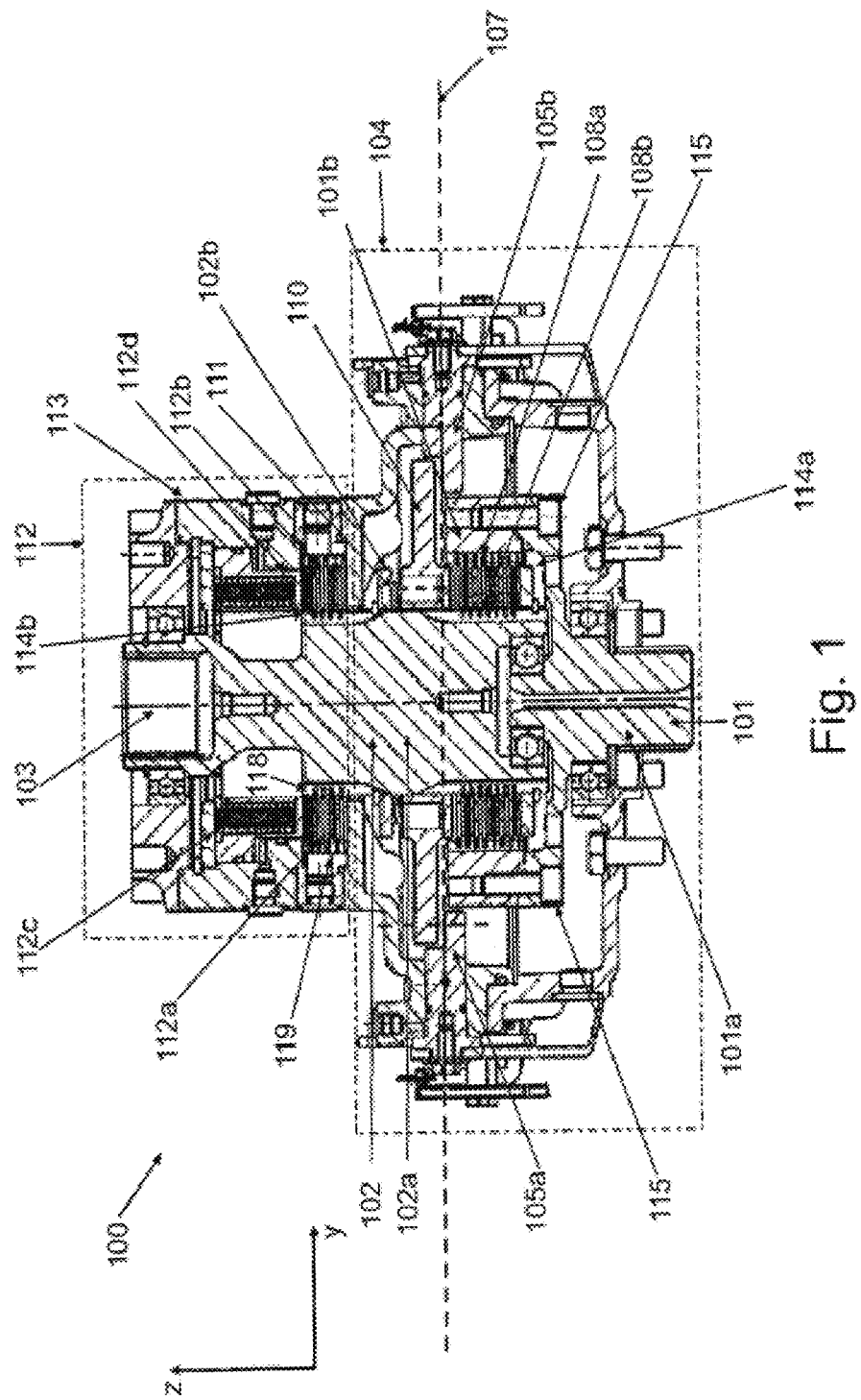
FIG. 1 schematically shows a sectional view of an embodiment of a connect and disconnect assembly of the presently proposed type.

Referring to FIG. 1, a connect and disconnect assembly 100 according to this embodiment includes a transmission shaft 101 and a drive shaft 102 aligned along a rotational axis 103 defining an axial direction. The shafts 101, 102 may be made of or may include a metal such as steel. When high strength is required, an alloy steel such as nickel, nickel-chromium or chromium-vanadium steel may be used. However, it is understood that in alternative embodiments the shafts 101, 102 may be made of or may include other materials.

The assembly 100 further has a housing 113. The shafts 101, 102 are rotatable relative to the housing 113. In the embodiment of the connect and disconnect assembly 100 depicted here, both shafts 101, 102 are at least partially disposed within the housing 113 and are each mounted in or on the housing by bearings. The connect and disconnect assembly 100 further has an optional parking brake assembly 112 configured to selectively frictionally engage the drive shaft 102 with the housing 113 for braking the drive shaft 102. It is understood that in alternative embodiments the connect and disconnect assembly 100 may not include a parking brake assembly.

The parking brake assembly 112 includes one or more first brake discs 112a rotationally fixed to the drive shaft 102, and one or more second brake discs 112b rotationally fixed to the housing 113 and configured to be frictionally engaged with the one or more first brake discs 112a. The first brake discs 112a and the second brake discs 112b are alternately disposed along the axial direction defined by the rotational axis 103. The brake discs 112a-b may be made of or may include a metal. For example, the first brake discs 112a may be made of steel, and the second brake discs 112b may be made of steel and include an outer layer made of a sintered friction material, or vice versa. However, it is understood that the brake discs 112a-b may include or may be made of other materials. The brake discs 112a-b may have holes or slots cut through them. These holes or slots may allow for better heat dissipation and may reduce noise, for example.

The one or more first brake discs 112a and the drive shaft 102 include correspondingly shaped recesses and protrusions, indicated at 118 in FIG. 1, extending along the axial direction defined by the rotational axis 103, and are engaged with one another via the correspondingly shaped recesses and protrusions 118 such that the one or more first brake discs 112a are rotationally fixed to the drive shaft 102 and are movable relative to the drive shaft 102 and/or relative to the housing 113 along the axial direction. Similarly, the one or more second brake discs 112b and the housing 113 include correspondingly shaped recesses and protrusions, indicated at 119 in FIG. 1, extending along the axial direction, and are engaged with one another via the correspondingly shaped recesses and protrusions 119 such that the one or more second brake discs 112b are rotationally fixed to the housing and are movable relative to the housing 113 along the axial direction. The recesses and protrusions 118, 119 may be produced via broaching, shaping, milling, hobbing, rolling, grounding and/or extruding, for example.

The recesses and protrusions 118 of the one or more first brake discs 112a and the drive shaft 102 are spline-shaped or lobe-shaped. Similarly, the recesses and protrusions 119 of the one or more second brake discs 112b and the housing 113 are spline-shaped or lobe-shaped. However, it is understood that the recesses and protrusions 118 through which the first brake discs 112a and the drive shaft 102 are engaged and/or that the recesses and protrusions 119 through which the second brake discs 112b and the housing 113 are engaged may have other forms or shapes.

The parking brake assembly 112 further comprises one or more biasing members 112c such as one or more springs biasing the one or more first brake discs 112a and the one or more second brake discs 112b into frictional engagement with one another. The biasing members 112c are supported on a portion of the housing 113. The biasing members 112c are disposed between the housing 113 and the brake pack including the brake discs 112a-b along the axial direction defined by the rotational axis 103. The biasing members 112c may include one or more compression springs such that a compression force is required to compress the biasing members 112c along the axial direction. The biasing members 112c are configured and disposed such that when they are not compressed they exert an engagement force on the brake pack including the brake discs 112a-b along the axial direction.

The parking brake assembly 112 further comprises a piston 112d disposed in between the biasing members 112c and the brake pack including the first brake discs 112a and the second brake discs 112b along the rotational axis 103. The piston 112d is configured to be moved along the axial direction defined by the rotational axis 103 and to counteract the biasing members 112c. Specifically, the piston 112d is configured to compress the biasing members 112c to allow the first brake discs 112a and the second brake discs 112b to frictionally disengage. In addition, elastic members may be disposed in between neighbouring brake discs 112a, 112b along the axial direction, thereby allowing the brake discs 112a, 112b to frictionally disengage from one another when the piston 112d compresses the biasing members 112c so that the biasing members 112c do not exert an engagement force on the brake pack including the brake discs 112a-b.

In the embodiment of the connect and disconnect assembly 100 depicted here, the piston 112d is configured to be actuated hydraulically. For example, as shown in FIG. 1, the piston 112d and the housing 113 may be configured such that a hydraulic chamber is formed in between a portion of the piston 112d and a portion of the housing 113. The hydraulic chamber may be selectively filled with a liquid such as oil. The piston 112d may then be moved along the axial direction by selectively filling and draining the hydraulic chamber. For example, the hydraulic chamber may be fluidly connected to a reservoir via a hydraulic pump (not shown). However, it is understood that in alternative embodiments not depicted here the piston 112d may be configured to be actuated by other than hydraulic means. For example, in other embodiments the piston 112d may be configured to be actuated by an electromagnetic actuator. The sectional view of FIG. 1 depicts a configuration in which the piston 112d compresses the one or more biasing members 112c such that the first brake discs 112a and the second brake discs 112b are not engaged and the drive shaft 102 is free to rotate relative to the housing 113.

As can be seen in FIG. 1, the transmission shaft 101 includes a first axial section 101a and a second axial section in the form of an annular or ring-shaped ring gear 101b. The ring gear 101b is disposed at an axial end of the transmission shaft facing the drive shaft 102. A diameter of the ring gear 101b is greater than a diameter of the first axial section 101a of the transmission shaft 101, wherein the diameters of the ring gear 101b and of the first axial section 101a of the transmission shaft 101 are determined perpendicularly to the axial direction defined by the rotational axis 103, respectively. In the embodiment depicted in FIG. 1, the first axial section 101a and the ring gear 101b of the transmission shaft 101 are configured as separate members connected to one another by screws 115. It is understood that in alternative embodiments the first axial section 101*a* and the ring gear 101*b* of the transmission shaft 101 may be connected to one another by welding or by other means. Also, it is conceivable that the first axial section 101*a* and the ring gear 101*b* are made in one piece. The ring gear 101*b* encompasses a portion of the drive shaft 102.

The connect and disconnect assembly 100 further comprises a connect and disconnect device 104 configured to selectively rotationally connect and disconnect the shafts 101, 102 to and from one another. The connect and disconnect device 104 comprises one or more first friction discs 108*a* rotationally fixed to the transmission shaft 101, and one or more second friction discs 108*b* rotationally fixed to the drive shaft 102. Specifically, the one or more first friction discs 108*a* are rotationally fixed to the ring gear 101*b* of the transmission shaft 101, in particular to a radially inner side of the ring gear 101*b* facing the rotational axis 103. Accordingly, the one or more second friction discs 108*b* are rotationally fixed to the portion of the drive shaft 102 encompassed by the ring gear 101*b* of the transmission shaft 101, in particular to a radially outer side or outer surface of the drive shaft 102 facing away from the rotational axis 103. The first and second frictions discs 108*a*, 108*b* are alternately disposed along the axial direction.

The friction discs 108*a*, 108*b* are disposed inside a first space 114*a* enclosed by the housing 113, and the brake discs 112*a*, 112*b* are disposed inside a second space 114*b* enclosed by the housing 113. The first space 114*a* and the second space 114*b* are in fluid communication with one another via gaps or slits formed in between the recesses and protrusions 118 connecting the drive shaft 102 and the first brake discs 112*a*. In this way, a lubricant filling or partially filling the first space 114*a* for lubricating and cooling the friction discs 108*a*-*b* and/or a lubricant filling or partially filling the second space 114*b* for lubricating and cooling the brake discs 112*a*-*b* may flow between the first space 114*a* and the second space 114*b*.

Figure 2:
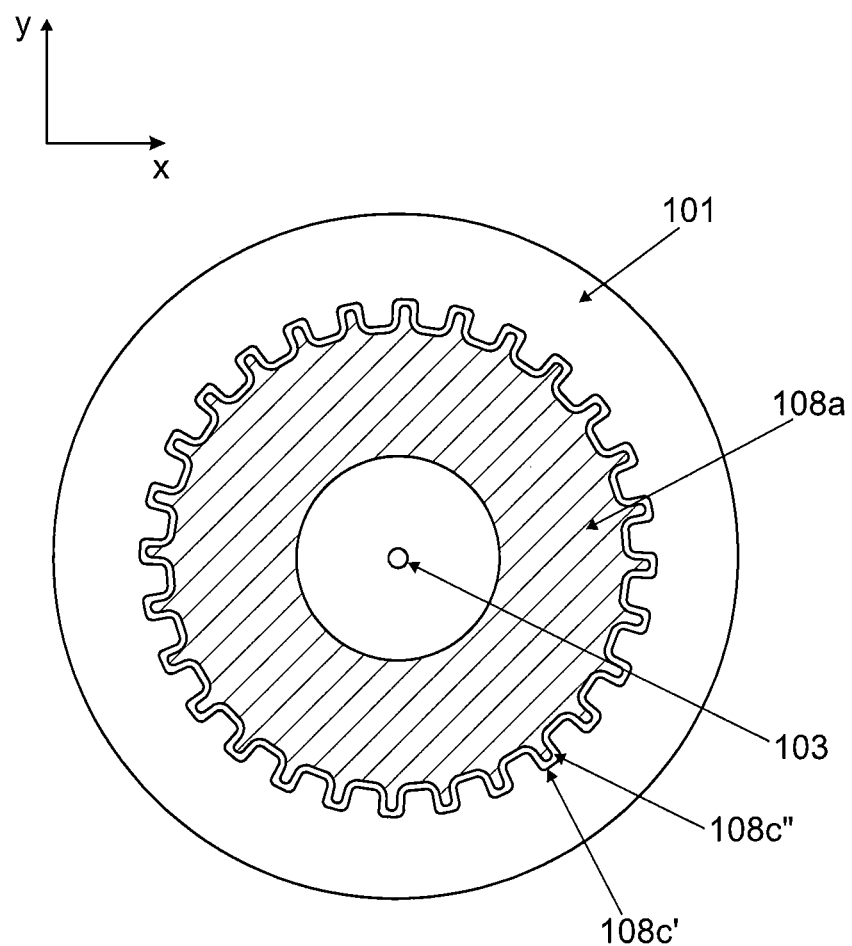
FIG. 2 schematically shows a sectional view of one or more first friction discs rotationally fixed to a first rotatable shaft according to an embodiment of the present invention.
Figure 3:
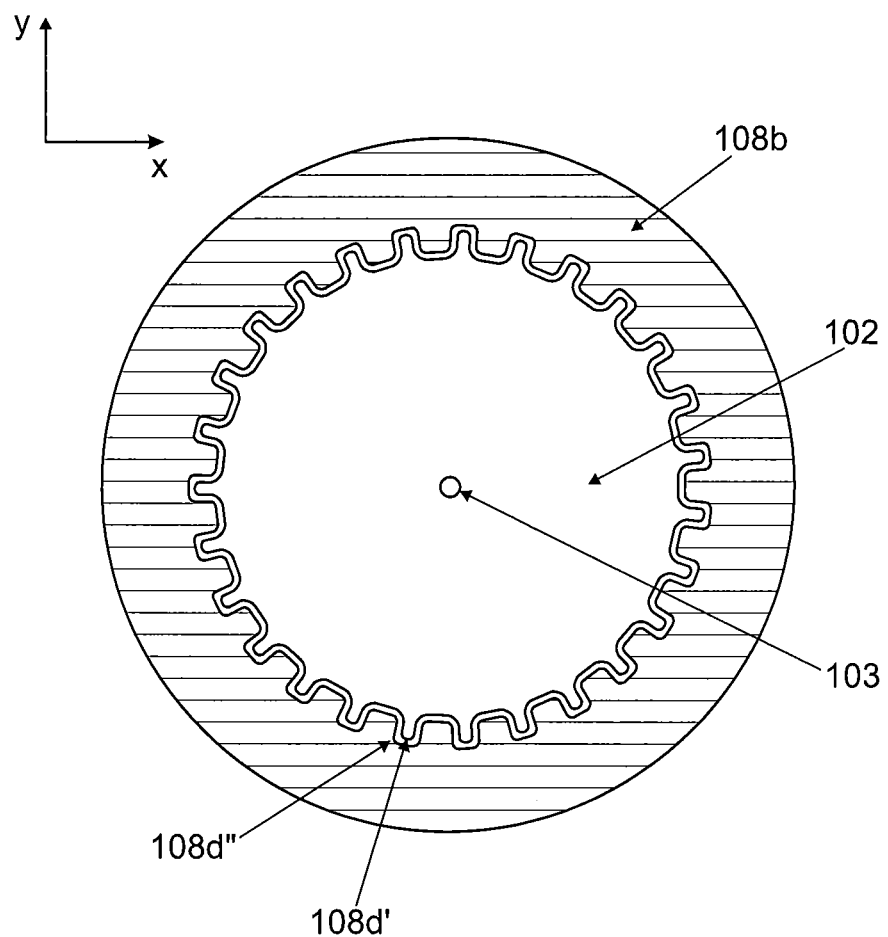
FIG. 3 schematically shows a sectional view of one or more second friction discs rotationally fixed to a second rotatable shaft according to an embodiment of the present invention.

FIG. 2 shows a sectional view of one of the first friction discs 108*a*, the transmission shaft 101, and the connection therebetween. Similarly, FIG. 3 shows a sectional view of one of the second friction discs 108*b*, the drive shaft 102, and the connection therebetween. Here and in all of the following, the same features recurring in different figures are designated with the same reference signs. In each of FIGS. 2 and 3 the sectional plane is arranged perpendicularly to the axial direction. The sectional planes of FIGS. 2 and 3 are disposed at different positions along the axial direction defined by the rotational axis 103.

As shown in FIG. 2, the one or more first friction discs 108*a* and the transmission shaft 101 include correspondingly shaped recesses and protrusions 108*c'*, 108*c"* extending along the axial direction defined by the rotational axis 103, and are engaged with one another via the recesses and protrusions 108*c'*, 108*c"* such that the one or more first friction discs 108*a* are rotationally fixed to the transmission shaft 101 and are movable relative to the transmission shaft 101 and/or relative to the housing 113 along the rotational axis 103. Similarly, as shown in FIG. 3, the one or more second friction discs 108*b* and the drive shaft 102 include correspondingly shaped recesses and protrusions 108*d'*, 108*d"* extending along the rotational axis 103, and are engaged with one another via the recesses and protrusions 108*d'*, 108*d"* such that the one or more second friction discs 108*b* are rotationally fixed to the drive shaft 102 and are movable relative to the drive shaft 102 along the axial direction.

The recesses and protrusions 108*c'*, 108*c"* of the one or more first frictions discs 108*a* and the drive shaft 101 are spline-shaped or lobe-shaped. Similarly, the recesses and protrusions 108*d'*, 108*d"* of the one or more second friction discs 108*b* and the second rotatable shaft 102 are spline-shaped or lobe-shaped. However, it is understood that in alternative embodiments the recesses and protrusions 108*c'*, 108*c"* and/or the recesses and protrusions 108*d'*, 108*d"* may have different forms or shapes. The recesses and protrusions 108*c'*, 108*c"* and/or the recesses and protrusions 108*d'*, 108*d"* may be produced via broaching, shaping, milling, hobbing, rolling, grounding and/or extruding. The splines and/or the lobes may be produced in a similar fashion.

The transmission shaft 101 and the drive shaft 102 can be selectively rotationally connected or locked to one another by frictionally engaging the first friction discs 108*a*, which are rotationally fixed to the transmission shaft 101, in particular to the ring gear 101*b*, with the second friction discs 108*b*, which are rotationally fixed to the drive shaft 102, in particular to the portion of the drive shaft 102 encompassed by the ring gear 101*b* of the transmission shaft 101.

In order to frictionally engage the first friction discs 108*a* with the second friction discs 108*b* to rotationally connect or lock the transmission shaft 101 and the drive shaft 102 to one another, the device 104 further has a biasing member 111 such as a spring, in particular a compression spring biasing the one or more first friction discs 108*a* and the one or more second friction discs 108*b* into engagement with one another. In the embodiment depicted in FIG. 1, the biasing member 111 is supported on a radially extending portion 102*b* of the drive shaft 102 along the axial direction defined by the rotational axis 103. Here, the radially extending portion 102*b* of the drive shaft 102 and a body portion 102*a* of the drive shaft 102 are configured as separate pieces connected to one another via connecting means such as a retaining ring, screws or bolts, or by welding. In other embodiments, the body portion 102*a* and the radially extending portion 102*b* may be formed in one piece. It is likewise conceivable that the biasing member 111 is supported on the transmission shaft 101 along the axial direction.

The device 104 further includes a piston 110. Here, the piston 110 has an annular shape and is disposed on or around the drive shaft 102. More specifically, the drive shaft 102 is received in a central recess or central bore of the piston 110. It is understood that in alternative embodiments the piston 110 may have other forms or shapes. The piston 110 is movable along the axial direction. More specifically, the piston 110 is movable relative to the drive shaft 102, relative to the transmission shaft 101 and relative to the housing 113 along the axial direction. In the embodiment depicted in the figures, the piston 110 is disposed in between the biasing member 111 and the disc pack including the first and second friction discs 108*a*, 108*b* along the axial direction. In other words, the biasing member 111 is configured to force the friction discs 108*a*, 108*b* into frictional engagement with one another via the piston 110. The piston 110 may be made of or may include a metal such as steel or iron. However, it is understood that the piston 110 could also be made of or could include other materials. The biasing member 111, the piston 110, and the friction discs 108*a*, 108*b* are disposed and configured such that when no external forces compress the biasing member 111 along the axial direction, the biasing member 111 forces the friction discs 108*a*, 108*b* into engagement with one another via the piston 110, thereby rotationally connecting or locking the transmission shaft 101 and the drive shaft 102 to one another. In other words, the connect and disconnect device 104 normally rotationally connects or locks the transmission shaft 101 and the drive shaft 102 to one another.

In order to selectively rotationally disconnect or unlock the transmission shaft 101 and the drive shaft 102 from one another the connect and disconnect device 104 includes a pair of pins. A cam 105a, 105b is connected to each of the pins. The pins are rotatably mounted on or supported by the housing 113. The pins and the cams 105a, 105b connected to or mounted on the pins are rotatable with respect to a cam axis 107. Here, the cam axis 107 is arranged perpendicularly to the rotational axis 103. It is at least conceivable that in alternative embodiments the cam axis 107 is not arranged exactly perpendicularly to the axial direction. Although the embodiment depicted in FIG. 1 includes two pins and two cams 105a, 105b, it is understood that alternative embodiments of the connect and disconnect device 104 may include only a single pin and a single cam or more than two pins and two cams. For example, the pins and the cams connected to the pins may be positioned at equal angular distances with respect to the rotational axis 103.

The cams 105a, 105b are configured to counteract the biasing member 111 by rotating the cams 105a, 105b with respect to the cam axis 107. Specifically, the cams 105a, 105b are configured to move or push the piston 110 along the axial direction, in particular in a direction away from the disc pack including the friction discs 108a, 108b, to compress or to at least partially compress the biasing member 111, thereby allowing the friction discs 108a, 108b to disengage. In addition, the connect and disconnect device 104 may include elastic members (not shown) disposed in between neighbouring friction discs 108a, 108b along the axial direction, wherein these elastic members are configured to force the friction discs 108a, 108b out of engagement when they are not forced into engagement by the biasing member 111. Along the axial direction, the piston 110 is disposed in between the cams 105a, 105b and the biasing member 111. FIG. 1 depicts the connect and disconnect device 104 in a configuration where the cams 105a, 105b allow the biasing member 111 to force the friction discs 108a, 108b into engagement with one another via the piston 110, thereby rotationally connecting or locking the transmission shaft 101 and the drive shaft 102 to one another. Specifically, in FIG. 1 the cams 105a, 105b and the piston 110 are not in contact with one another.

Figure 4:
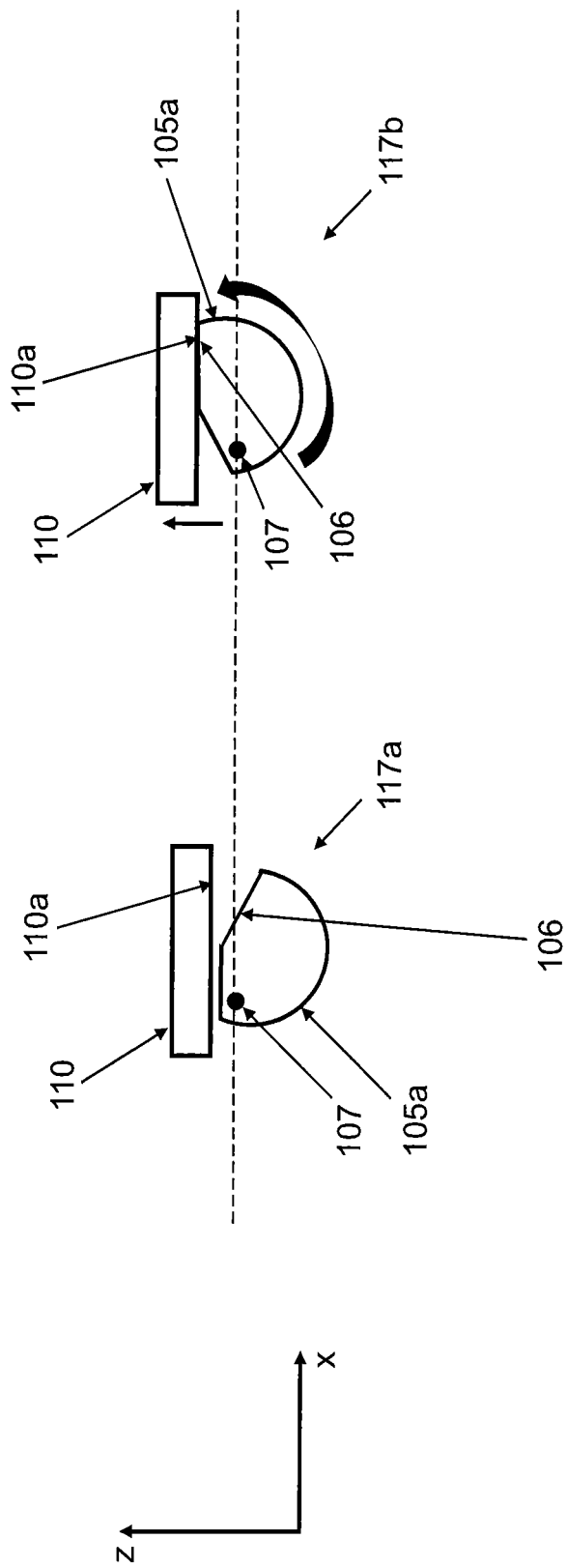
FIG. 4 is a schematic view of a cam of a connect and disconnect device of a connect and disconnect assembly according to an embodiment of the present invention.

FIG. 4 is a schematic illustration of a sectional view of a detail of FIG. 1 wherein the detail includes a portion of the piston 110 and a portion of the cam 105a. The sectional plane of FIG. 4 is arranged perpendicularly to the sectional plane of FIG. 1. FIG. 4 shows that the cam 105a has a non-circular cross section, allowing the cam 105a to move the piston 110 along the axial direction by turning the cam 105a with respect to the cam axis 107. FIG. 4 further shows that the cam 105a has a level surface portion 106 and the piston 110 has a level surface portion 110a. By turning the cam 105a with respect to the cam axis 107, the cam 105a and the piston 110 can be brought from a first configuration 117a to a second configuration 117b. The level surface portion 106 of the cam 105a is arranged in parallel to the cam axis 107 and disposed at a distance from the cam axis 107.

In the first configuration 117a, which corresponds with the situation depicted in FIG. 1, the cam 105a and the piston 110 are not in contact with one another, the cam 105a thereby allowing the biasing member 111 to force the friction discs 108a, 108b into engagement with one another via the piston 110 so that the shafts 101, 102 are rotationally connected or locked to one another.

In the second configuration 117b, the cam 105a has moved the piston 110 away from the disc pack including the friction discs 108a, 108b along the axial direction with respect to the first configuration 117a. Specifically, in the second configuration 117b the level surface portions 106 and 110a of the cam 105a and of the piston 110, respectively, abut one another, and the cam 105a supports the level surface portion 110a of the piston 110 on the level surface portion 106 of the cam 105a. The cam 105a thereby holds the piston 110 in a position where the piston 110 compresses or at least partially compresses the biasing member 111, thereby allowing the friction discs 108a, 108b to disengage so that the shafts 101, 102 are disconnected or unlocked and are free to rotate relative to one another. In the second configuration 117b depicted in FIG. 4 the level surface portions 106 and 110a contacting one another are arranged perpendicularly to the axial direction defined by the rotational axis 103. This configuration may further stabilize the piston 110 in the position where it compresses or at least partially compresses the biasing member 111 and allows the friction discs 108a, 108b to disengage.

Figure 5:
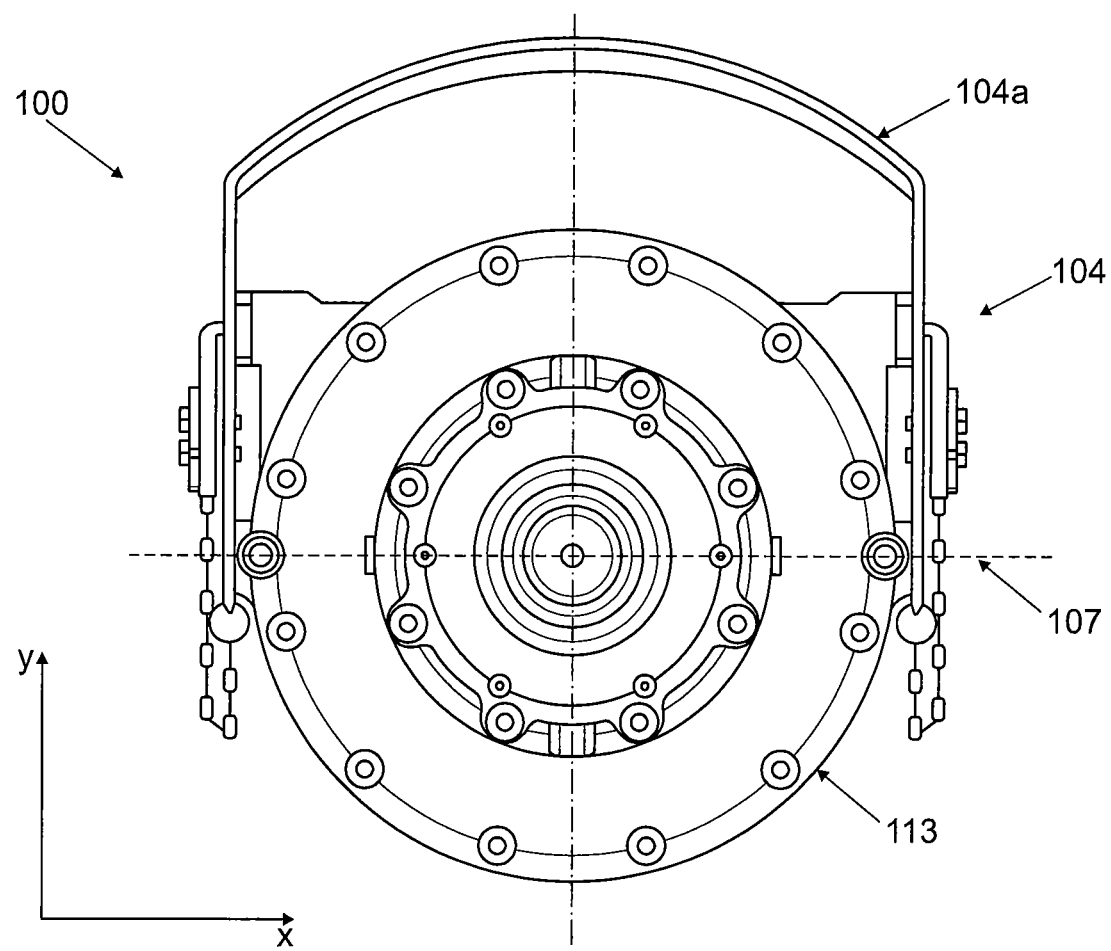
FIG. 5 is a schematic view of a lever of a connect and disconnect device of a connect and disconnect assembly according to an embodiment of the present invention.
Figure 6:
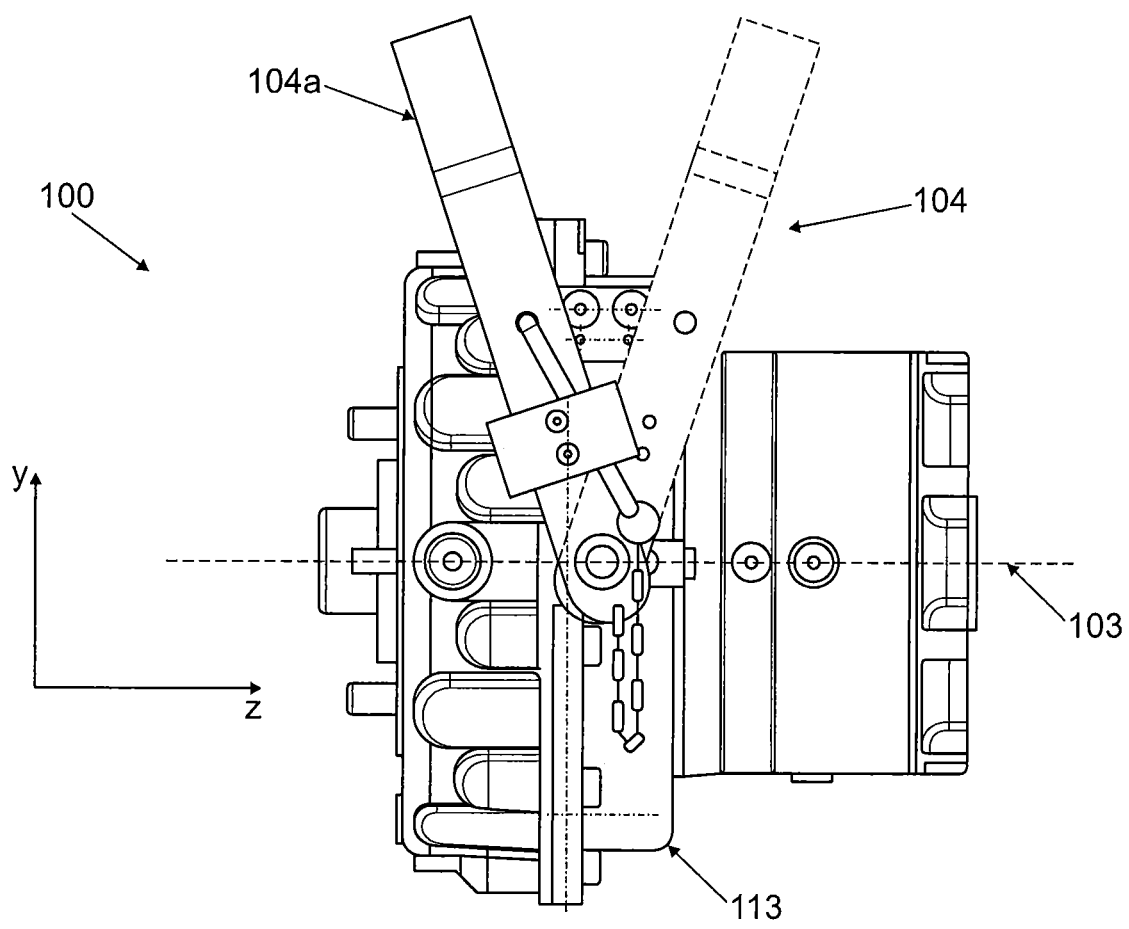
FIG. 6 is a schematic view of a lever of a connect and disconnect device of a connect and disconnect assembly according to an embodiment of the present invention.

FIGS. 5 and 6 each show a schematic view of the connect and disconnect assembly 100 of FIG. 1, wherein the connect and disconnect device 104 further includes a U-shaped lever 104a which connects the pins to which the two cams 105a, 105b are attached or mounted. The lever 104a thereby allows the cams 105a, 105b to be actuated or turned manually to move the cams 105a, 106b between the two configurations 117a, 117b depicted in FIG. 4. FIG. 5 further highlights the housing 113 and the cam axis 107 depicted in FIGS. 1 and 4. And FIG. 6 further highlights the rotational axis 103.

The connect and disconnect assembly 100 may further comprise a motor drivingly engaged or selectively drivingly engaged with the drive shaft 102 for driving the drive shaft 102. The motor may comprise a hydraulic motor, a pneumatic motor or an electric motor, for example. When the connect and disconnect assembly 100 comprises an electric motor, the electric motor may comprise an electric parking brake assembly integrated with the electric motor.

Figure 7:
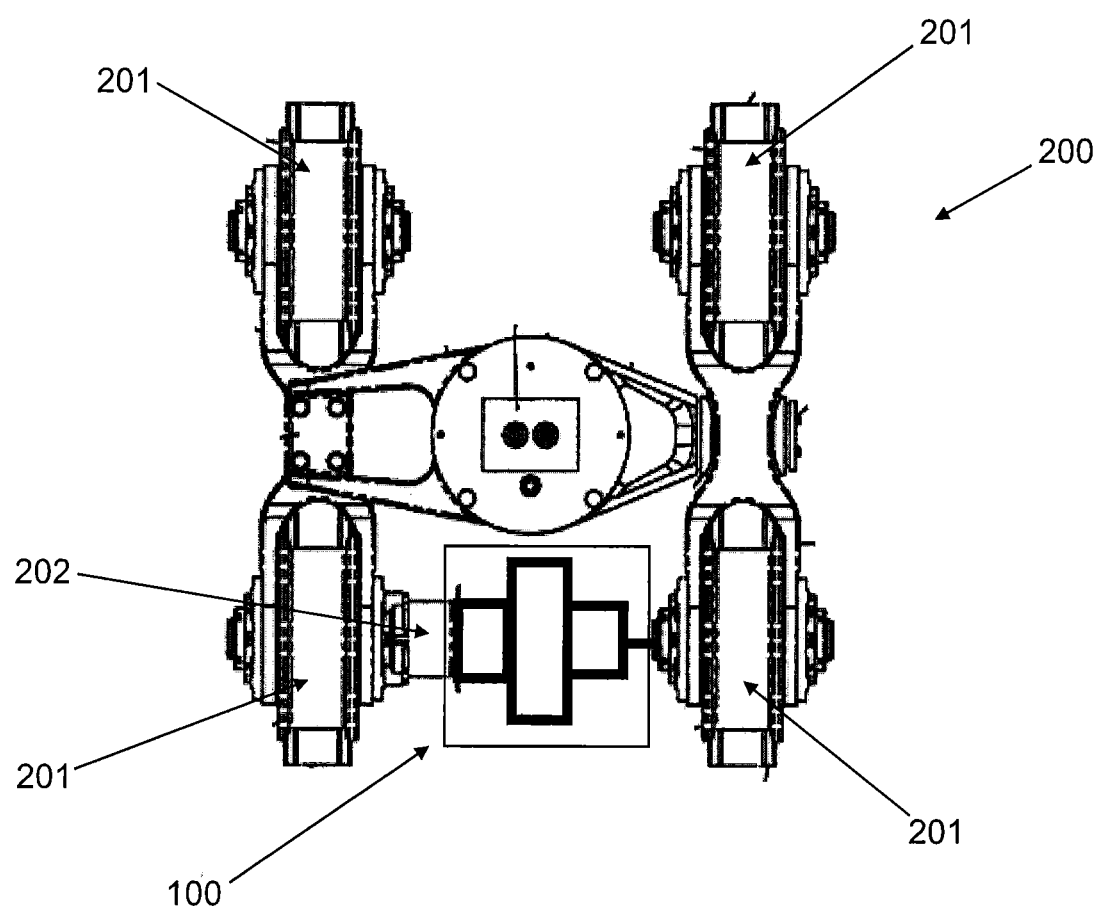
FIG. 7 is a schematic view of a ship-lift bogie including a connect and disconnect assembly according to an embodiment of the present invention.

FIG. 7 is a schematic view of a ship-lift bogie 200 including the connect and disconnect assembly 100 of the previously described type. Referring to FIG. 7, the ship-lift bogie 200 has two pairs of wheels 201 configured to run on a railtrack. Here, one of the pairs of wheels 201 is drivingly engaged or selectively drivingly engaged with the transmission shaft 101 of the connect and disconnect assembly 100. For example, the transmission shaft 101 may be drivingly connected with the wheels via a gear box. The connect and disconnect assembly 100 included in the ship-lift bogie 200 also has a motor 202 drivingly engaged with the drive shaft 102 of the connect and disconnect assembly 100. The motor 202 may be configured as a hydraulic motor, for example. The ship-lift bogie 200 may be used as part of a shiplift using a transfer system for ships so that the vessels can be transported from the water to a parking place, for example. The connect and disconnect assembly 100 included in the ship-lift bogie 200 allows selectively connecting and disconnecting the motor 202 from the wheels 201. Disconnecting the wheels 201 from the motor 202 may be advantageous when the shift-lift bogie 200 is pulled from one location of a shipyard to another at a high speed, such as by a forklift. Without the connect and disconnect assembly 100, not being able to disconnect the motor from the wheels in such situations may cause the motor to overspeed, which may cause damage to the motor. The ship-lift bogie 200 including the connect and disconnect assembly 100 may therefore increase work efficiency.

However, it should be noted that the connect and disconnect assembly 100 described herein may be used in vehicles or machinery other than ship-lift bogies such as in winches, cranes, assembly lines, presses, mills, or the like. However, it is understood that the connect and disconnect assembly 100 is equally well suited to be used in other devices or assemblies than those listed above.

The invention claimed is:

1. A connect and disconnect assembly, comprising:
   a first rotatable shaft and a second rotatable shaft aligned along a rotational axis; and
   a connect and disconnect device including one or more cams for selectively connecting and disconnecting the first rotatable shaft to and from the second rotatable shaft,
   wherein the connect and disconnect device further comprises:
   one or more first friction discs rotationally fixed to the first rotatable shaft, and
   one or more second friction discs rotationally fixed to the second rotatable shaft,
   wherein the one or more cams are configured to selectively engage and disengage the one or more first friction discs with and from the one or more second friction discs,
   wherein the first rotatable shaft includes a ring gear encompassing a portion of the second rotatable shaft, wherein the one or more first friction discs are rotationally fixed to the ring gear of the first rotatable shaft and wherein the one or more second friction discs are rotationally fixed to the portion of the second rotatable shaft encompassed by the ring gear of the first rotatable shaft.

2. The connect and disconnect assembly according to claim 1, wherein the one or more cams are rotatable with respect to a cam axis and the cam axis is arranged in a plane perpendicular to the rotational axis.

3. The connect and disconnect assembly according to claim 1, wherein the one or more first friction discs and the first rotatable shaft include correspondingly shaped recesses and protrusions and are engaged with one another via the correspondingly shaped recesses and protrusions such that the one or more first friction discs are rotationally fixed to the first rotatable shaft and are movable relative to the first rotatable shaft along the rotational axis, and/or wherein the one or more second friction discs and the second rotatable shaft include correspondingly shaped recesses and protrusions and are engaged with one another via the correspondingly shaped recesses and protrusions such that the one or more second friction discs are rotationally fixed to the second rotatable shaft and are movable relative to the second rotatable shaft along the rotational axis.

4. The connect and disconnect assembly according to claim 1, the connect and disconnect device further comprising a piston movable relative to the first rotatable shaft and relative to the second rotatable shaft along the rotational axis, wherein the piston is configured to force the one or more first friction discs and the one or more second friction discs into engagement with one another.

5. The connect and disconnect assembly according to claim 4, the connect and disconnect device further comprising a first biasing member biasing the one or more first friction discs and the one or more second friction discs into engagement with one another via the piston.

6. The connect and disconnect assembly according to claim 5, wherein the first biasing member is supported on the first rotatable shaft or on the second rotatable shaft.

7. The connect and disconnect assembly according to claim 4, wherein the one or more cams are configured to move the piston along the rotational axis.

8. The connect and disconnect assembly according to claim 7, wherein the one or more cams are configured to push the piston away from the one or more first friction discs and from the one or more second friction discs to disengage the one or more first friction discs and the one or more second friction discs from one another.

9. The connect and disconnect assembly according to claim 8, wherein the one or more cams and the piston each comprise a level surface portion and the one or more cams are configured to hold the piston in a position in which the piston allows the one or more first friction plates and the one or more second friction plates to disengage from one another by supporting the level surface portion of the piston on the level surface portion of the one or more cams.

10. The connect and disconnect assembly according to claim 9, wherein the one or more cams and the piston are configured such when the one or more cams support the level surface portion of the piston on the level surface portion of the one or more cams, the level surface portion of the piston and the level surface portion of the one or more cams are arranged perpendicular to the rotational axis.

11. The connect and disconnect assembly according to claim 1, the connect and disconnect device further comprising a lever connected to the one or more cams for rotating the one or more cams.

12. The connect and disconnect assembly according to claim 1, further comprising a motor drivingly engaged with or selectively drivingly engaged with the second rotatable shaft, wherein the motor comprises a hydraulic motor, a pneumatic motor or an electric motor.

13. The connect and disconnect assembly according to claim 1, further comprising a housing, wherein the second rotatable shaft is rotatably disposed within the housing, and further comprising a parking brake assembly configured to selectively frictionally engage the second rotatable shaft with the housing.

14. The connect and disconnect assembly according to claim 13, wherein the parking brake assembly further comprises:
   one or more first brake discs rotationally fixed to the second rotatable shaft, and
   one or more second brake discs rotationally fixed to the housing and configured to be frictionally engaged with the one or more first brake discs.

15. The connect and disconnect assembly according to claim 14, wherein the one or more first brake discs and the second rotatable shaft include correspondingly shaped recesses and protrusions and are engaged with one another via the correspondingly shaped recesses and protrusions such that the one or more first brake discs are rotationally fixed to the second rotatable shaft and are movable relative to the second rotatable shaft along the rotational axis, and/or wherein the one or more second brake discs and the housing include correspondingly shaped recesses and protrusions and are engaged with one another via the correspondingly shaped recesses and protrusions such that the one or more second brake discs are rotationally fixed to the housing and are movable relative to the housing along the rotational axis.

16. The connect and disconnect assembly according to claim 14, wherein the housing encloses a first space accommodating the one or more first friction discs and the one or more second friction discs, and the housing enclosing a second space accommodating the one or more first brake discs and the one or more second brake discs, wherein the first space is in fluid communication with the second space thereby allowing a lubricant to pass from the first space to the second space, or vice versa.

17. The connect and disconnect assembly according to claim 16, wherein the first space and the second space are in fluid communication with one another via the recesses of the first friction discs and/or of the second rotatable shaft.

18. A ship-lift bogie comprising a pair of wheels configured to run on a railtrack and comprising the connect and disconnect assembly according to claim 1, wherein the pair of wheels is drivingly engaged or selectively drivingly engaged with the first rotatable shaft.

19. A connect and disconnect assembly, comprising:
   a first rotatable shaft and a second rotatable shaft aligned along a rotational axis; and
   a connect and disconnect device including one or more cams for selectively connecting and disconnecting the first rotatable shaft to and from the second rotatable shaft,
   wherein the connect and disconnect device further comprises:
   one or more first friction discs rotationally fixed to the first rotatable shaft, and
   one or more second friction discs rotationally fixed to the second rotatable shaft,
   wherein the first rotatable shaft includes a ring gear encompassing a portion of the second rotatable shaft, wherein the one or more first friction discs are rotationally fixed to the ring gear of the first rotatable shaft and wherein the one or more second friction discs are rotationally fixed to the portion of the second rotatable shaft encompassed by the ring gear of the first rotatable shaft.

* * * * *